(12) United States Patent
Toda

(10) Patent No.: US 10,935,391 B2
(45) Date of Patent: Mar. 2, 2021

(54) ELECTRONIC DEVICE FOR IMPROVING ALTITUDE MEASUREMENT ACCURACY

(71) Applicant: CASIO COMPUTER CO., LTD., Tokyo (JP)

(72) Inventor: Naoto Toda, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 307 days.

(21) Appl. No.: 16/004,278

(22) Filed: Jun. 8, 2018

(65) Prior Publication Data

US 2018/0364065 A1 Dec. 20, 2018

(30) Foreign Application Priority Data

Jun. 19, 2017 (JP) .............................. JP2017-119872

(51) Int. Cl.
| G01C 25/00 | (2006.01) |
| G01S 19/48 | (2010.01) |
| G01C 5/06 | (2006.01) |
| G01S 19/53 | (2010.01) |

(52) U.S. Cl.
CPC ............... *G01C 25/00* (2013.01); *G01C 5/06* (2013.01); *G01S 19/48* (2013.01); *G01S 19/53* (2013.01)

(58) Field of Classification Search
CPC .. G01C 5/06; G01C 25/00; G01S 5/01; G01S 5/017; G01S 19/48; G01S 19/53
See application file for complete search history.

(56) References Cited

U.S. PATENT DOCUMENTS

| 2011/0144910 A1 | 6/2011 | Sakashita |
| 2016/0054451 A1 | 2/2016 | Fukami et al. |

FOREIGN PATENT DOCUMENTS

| EP | 2 988 095 A1 | 2/2016 |
| JP | H05-45436 A | 2/1993 |
| JP | 4602634 B2 | 12/2010 |
| JP | 5292316 B2 | 9/2013 |
| JP | 2014-130010 A | 7/2014 |
| JP | 2015-46697 A | 3/2015 |
| JP | 2016-45193 A | 4/2016 |
| JP | 6078804 B2 | 2/2017 |
| WO | 2012/155000 A2 | 11/2012 |

OTHER PUBLICATIONS

European Search Report dated Nov. 6, 2018, in a counterpart European patent application No. 18178326.7.
Japanese Office Action dated Jul. 23, 2019, in a counterpart Japanese patent application No. 2017-119872. A machine translation (not reviewed for accuracy) attached.

*Primary Examiner* — Dao L Phan
(74) *Attorney, Agent, or Firm* — Chen Yoshimura LLP

(57) ABSTRACT

Altitude detection by an electronic device includes: obtaining altitude information at a location of the electronic device by satellite positioning; obtaining altitude information at said location on the basis of atmospheric pressure data detected at said location; obtaining error in the satellite positioning; and, on the basis of the error obtained, causing the altitude information obtained by the satellite positioning and the altitude information obtained on the basis of the detected atmospheric pressure data to be selectively output to a user or a component of the electronic device.

14 Claims, 15 Drawing Sheets

ELECTRONIC DEVICE FOR IMPROVING ALTITUDE MEASUREMENT ACCURACY

BACKGROUND OF THE INVENTION

Field of the Invention

The present invention relates to an electronic device for improving altitude measurement accuracy.

Background Art

In recent years, technologies which measure altitude using atmospheric pressure sensors have become well-known.

For example, Japanese Patent No. 5292316 discloses a technology which corrects an offset in an altitude measured using an atmospheric pressure sensor on the basis of an altitude measured using the Global Positioning System (GPS) or the like.

SUMMARY OF THE INVENTION

Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an electronic device, including: a processor; and a first storage unit storing programs to be executed by the processor, wherein the processor reads out the programs stored on the first storage unit to execute: an error obtaining process of obtaining error in satellite positioning when satellite positioning is to be performed; and a control process of, on the basis of the error obtained by the error obtaining process, performing either one of or both of a satellite-based altitude information obtaining process and a sensor-based altitude information obtaining process, and causing altitude information obtained by the satellite-based altitude information obtaining process and altitude information obtained by the sensor-based altitude information obtaining process to be selectively output to a user or a component of the electronic device, wherein the satellite-based altitude information obtaining process obtains the altitude information at a location of the electronic device by satellite positioning, and the sensor-based altitude information obtaining process obtains the altitude information at a location of the electronic device on the basis of atmospheric pressure data detected at the location.

In another aspect, the present disclosure provides an electronic device, including: a processor; and a storage unit storing a program to be executed by the processor, wherein the processor reads out the program stored on the storage unit to execute the following: identifying a location of the electronic device at which satellite-based altitude information that is obtained by satellite positioning has an error that is less than or equal to a prescribed threshold accuracy value; and performing an altitude correction process of correcting sensor-based altitude information that is obtained using atmospheric pressure data detected at the location, on the basis of the satellite-based altitude information that has the error of less than or equal to the prescribed threshold accuracy value.

In another aspect, the present disclosure provides a method of measuring altitude to be performed by a processor in an electronic device, the method including: an error obtaining process of obtaining error in satellite positioning when satellite positioning is to be performed; and a control process of, on the basis of the error obtained by the error obtaining process, performing either one of or both of a satellite-based altitude information obtaining process and a sensor-based altitude information obtaining process, and causing altitude information obtained by the satellite-based altitude information obtaining process and altitude information obtained by the sensor-based altitude information obtaining process to be selectively output to a user or a component of the electronic device, wherein the satellite-based altitude information obtaining process obtains the altitude information at a location of the electronic device by satellite positioning, and the sensor-based altitude information obtaining process obtains the altitude information at a location of the electronic device on the basis of atmospheric pressure data detected at the location.

In another aspect, the present disclosure provides a method of measuring altitude to be performed by a processor in an electronic device, including: identifying a location of the electronic device at which satellite-based altitude information that is obtained by satellite positioning has an error that is less than or equal to a prescribed threshold accuracy value; and performing an altitude correction process of correcting sensor-based altitude information that is obtained using atmospheric pressure data detected at the location, on the basis of the satellite-based altitude information that has the error of less than or equal to the prescribed threshold accuracy value.

In another aspect, the present disclosure provides a computer-readable non-transitory storage medium having stored thereon a program to be executed by a processor in an electronic device, the program causing the processor to perform the following: an error obtaining process of obtaining error in satellite positioning when satellite positioning is to be performed; and a control process of, on the basis of the error obtained by the error obtaining process, performing either one of or both of a satellite-based altitude information obtaining process and a sensor-based altitude information obtaining process, and causing altitude information obtained by the satellite-based altitude information obtaining process and altitude information obtained by the sensor-based altitude information obtaining process to be selectively output to a user or a component of the electronic device, wherein the satellite-based altitude information obtaining process obtains the altitude information at a location of the electronic device by satellite positioning, and the sensor-based altitude information obtaining process obtains the altitude information at a location of the electronic device on the basis of atmospheric pressure data detected at the location.

In another aspect, the present disclosure provides a computer-readable non-transitory storage medium having stored thereon a program to be executed by a processor in an electronic device, the program causing the processor to perform the following: identifying a location of the electronic device at which satellite-based altitude information that is obtained by satellite positioning has an error that is less than or equal to a prescribed threshold accuracy value; and performing an altitude correction process of correcting sensor-based altitude information that is obtained using atmospheric pressure data detected at the location, on the basis of the satellite-based altitude information that has the error of less than or equal to the prescribed threshold accuracy value.

It is to be understood that both the foregoing general description and the following detailed description are exemplary and explanatory, and are intended to provide further explanation of the invention as claimed.

DETAILED DESCRIPTION OF THE PREFERRED EMBODIMENTS

Next, embodiments of the present invention will be described with reference to figures.

Embodiment 1

Figure 1:
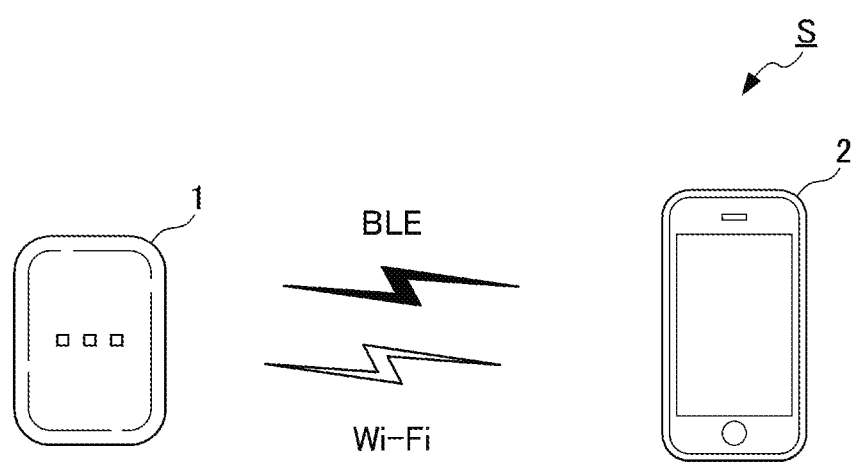
FIG. 1 is a system configuration diagram illustrating a configuration of an altitude information recording system including an altitude information obtaining device according to an embodiment of the present invention.

FIG. 1 is a system configuration diagram illustrating a configuration of an altitude information recording system S including an altitude information obtaining device 1 according to an embodiment of the present invention. Moreover, FIG. 2 is a schematic drawing illustrating an example of usage of the altitude information recording system S.

Figure 2:
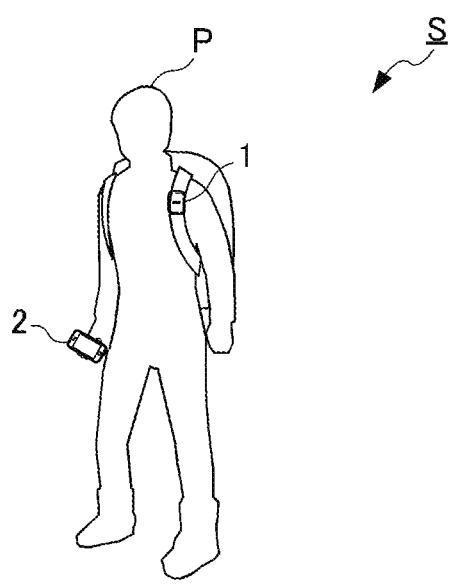
FIG. 2 is a schematic drawing illustrating an example of usage of the altitude information recording system.

As illustrated in FIGS. 1 and 2, the altitude information recording system S includes the altitude information obtaining device 1 and a processing device 2. Moreover, the altitude information obtaining device 1 and the processing device 2 are configured to be able to communicate via a wireless communication technology such as Bluetooth Low Energy/Bluetooth LE (registered trademark; hereinafter, "BLE") or Wi-Fi (registered trademark).

The altitude information obtaining device 1 executes a satellite positioning process (described later) to calculate position on the basis of radio waves from navigation satellites.

Moreover, the altitude information obtaining device 1 functions as a sensor device including various types of sensors and can be attached to a measurement subject to sense movement of the measurement subject and obtain sensor information. Furthermore, in the present embodiment, the altitude information obtaining device 1 includes an atmospheric pressure sensor and executes an altitude calculation process (described later) to calculate altitude from the atmospheric pressure detected by the atmospheric pressure sensor. In the present embodiment, the altitude information obtaining device 1 is attached to a user (hereinafter, a "measurement subject P") engaged in an activity such as trekking in order to sense the movement of the measurement subject P and the local atmospheric pressure. As one example, the altitude information obtaining device 1 can be attached to the shoulder strap of a backpack carried by the measurement subject P.

In addition, the altitude information obtaining device 1 executes an altitude recording control process (described later) to select either an altitude obtained as a positioning result based on radio waves from navigation satellites (hereinafter, a "positioning-based altitude") or an altitude obtained as a processing result from the altitude calculation process (hereinafter, a "calculated altitude"), and then record the selected altitude as altitude information of the altitude information obtaining device 1.

The processing device 2 obtains the altitude information of the altitude information obtaining device 1 output from the altitude information obtaining device 1 and displays the altitude of the altitude information obtaining device 1.

<Hardware Configuration>

Figure 3:
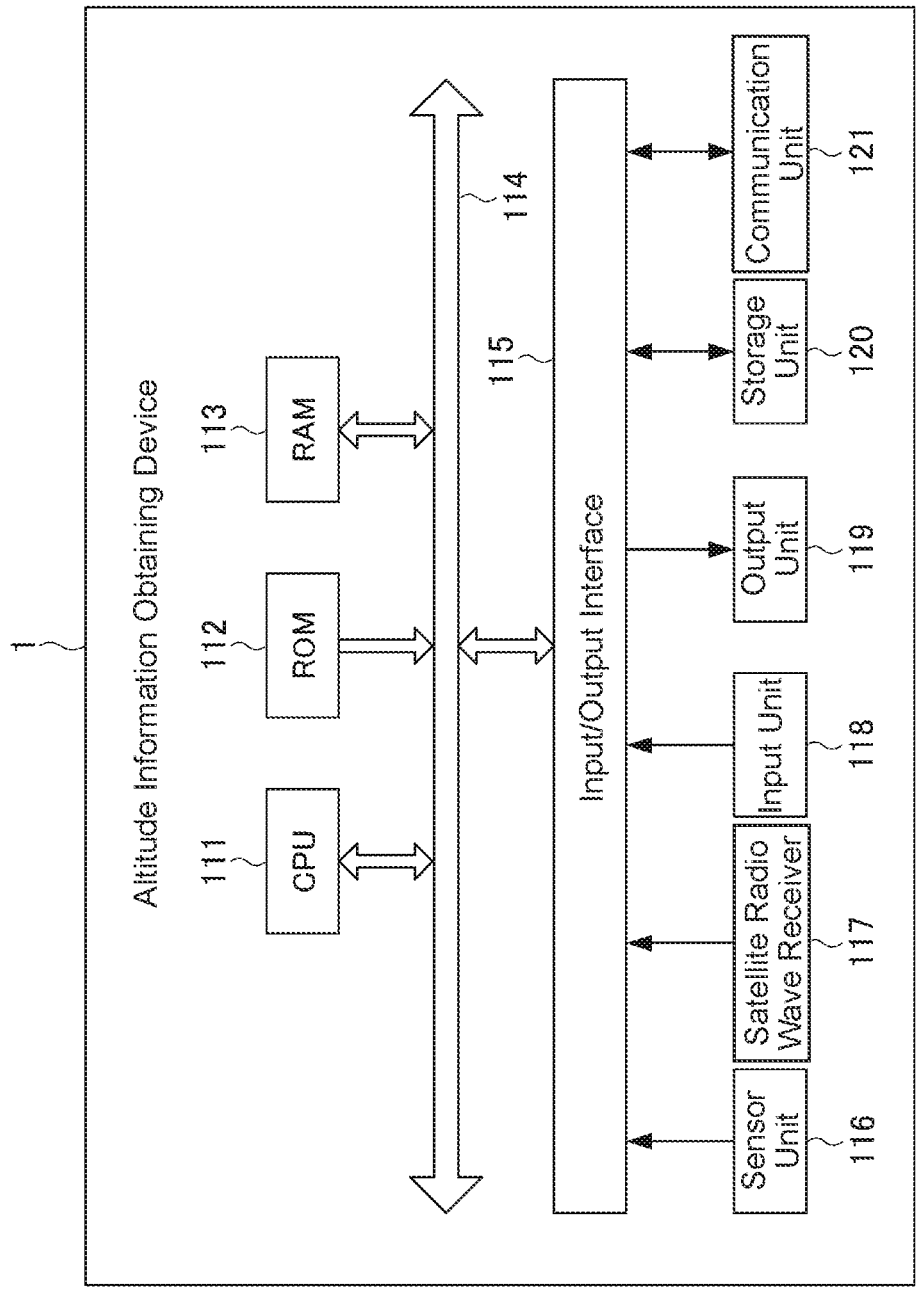
FIG. 3 is a block diagram illustrating a hardware configuration of the altitude information obtaining device.

FIG. 3 is a block diagram illustrating a hardware configuration of the altitude information obtaining device 1.

The altitude information obtaining device 1 is an embodiment of an electronic device according to the present invention and here is configured as a sensor device including various types of sensors for detecting the movement of a measurement subject and the local atmospheric pressure.

As illustrated in FIG. 3, the altitude information obtaining device 1 includes a central processing unit (CPU) 111, a read-only memory (ROM) 112, a random-access memory (RAM) 113, a bus 114, an input/output interface 115, a sensor unit 116, a satellite radio wave receiver 117, an input unit 118, an output unit 119, a storage unit 120, and a communication unit 121. The altitude information obtaining device 1 may be configured to accept a removable medium such as semiconductor memory.

The CPU 111 executes various processes in accordance with programs stored in the ROM 112 or programs loaded into the RAM 113 from the storage unit 120.

The RAM 113 also stores, as appropriate, any data or the like that the CPU 111 needs to execute these various processes.

The CPU 111, the ROM 112, and the RAM 113 are connected to one another via the bus 114. Moreover, the input/output interface 115 is also connected to the bus 114. The sensor unit 116, the satellite radio wave receiver 117, the input unit 118, the output unit 119, the storage unit 120, and the communication unit 121 are connected to the input/output interface 115.

The sensor unit 116 includes a three-axis acceleration sensor which detects acceleration in three axial directions, a three-axis angular velocity sensor which detects angular velocity in three axial directions, a three-axis geomagnetic sensor which detects geomagnetism in three axial directions, and an atmospheric pressure sensor which detects atmospheric pressure. The sensor unit 116 uses the three-axis acceleration sensor, the three-axis angular velocity sensor, the three-axis geomagnetic sensor, and the atmospheric pressure sensor to detect atmospheric pressure and acceleration, angular velocity, and geomagnetism in three axial directions at a prescribed sampling frequency (such as every 0.001 second). The acceleration, angular velocity, geomagnetism, and atmospheric pressure data detected by the sensor unit 116 is associated with measurement time data and then stored on the storage unit 120 or sent to the processing device 2. The sensor unit 116 can include various types of sensors (such as an atmospheric temperature sensor) in addition to the three-axis acceleration sensor, the three-axis angular velocity sensor, and the three-axis geomagnetic sensor.

The satellite radio wave receiver 117 detects the position (latitude, longitude, and altitude) of the altitude information obtaining device 1 as well as the current time on the basis of radio waves received from navigation satellites.

The input unit 118 is constituted by various types of buttons or the like and various types of information are input via the input unit 118 in accordance with input operations by the measurement subject P (user).

The output unit 119 is constituted by a light, a speaker, a vibration motor, or the like and outputs light, sound, or vibration signals.

The storage unit 120 is constituted by semiconductor memory such as dynamic random-access memory (DRAM) and stores various types of data.

The communication unit 121 controls communication with other devices performed using direct wireless communications therebetween. In the present embodiment, the communication unit 121 communicates with the processing device 2 using BLE (registered trademark) or Wi-Fi (registered trademark).

Figure 4:
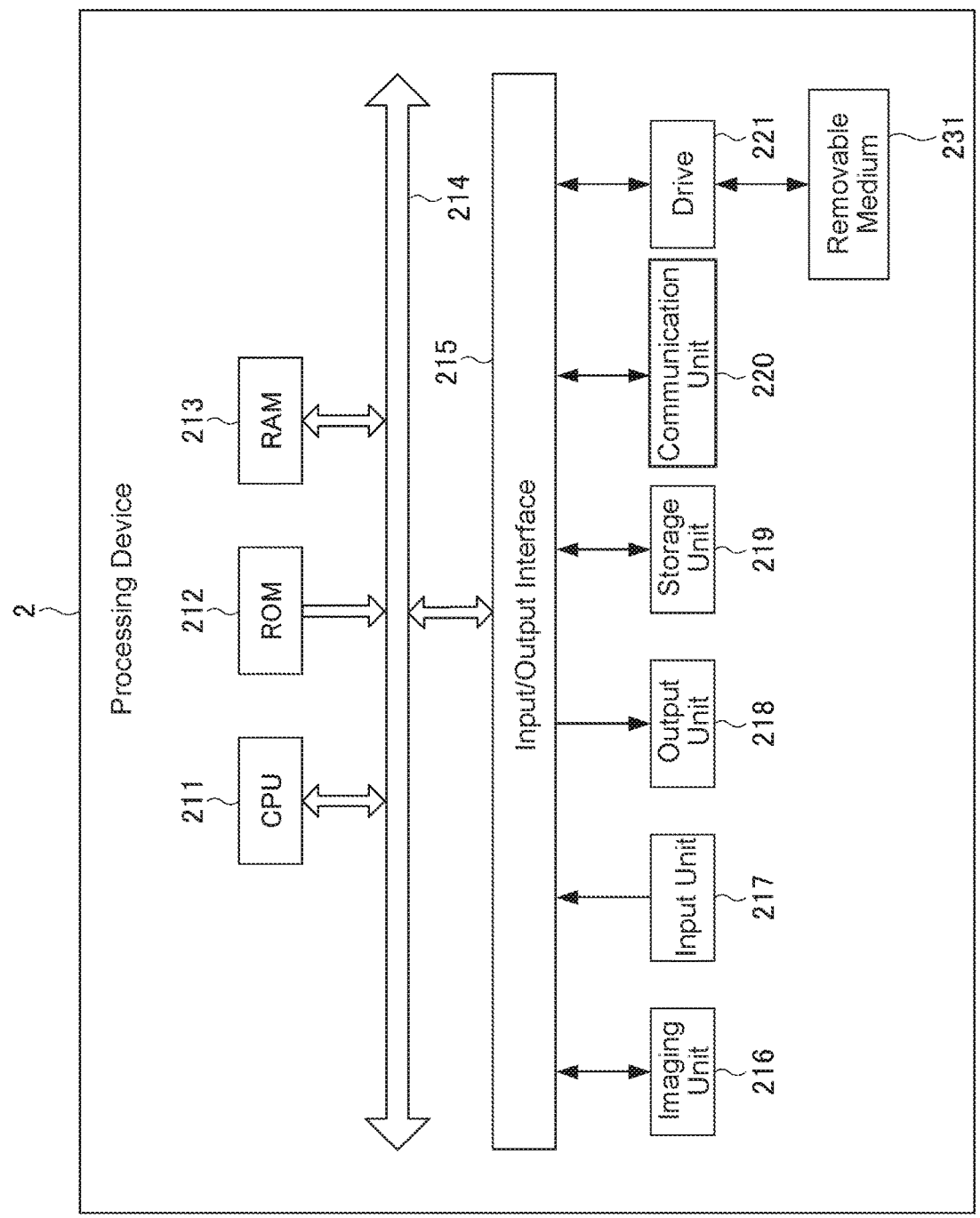
FIG. 4 is a block diagram illustrating a hardware configuration of a processing device.

FIG. 4 is a block diagram illustrating a hardware configuration of the processing device 2.

The processing device 2 is an information processing device having an information display feature, such as a smartphone.

As illustrated in FIG. 4, the processing device 2 includes a CPU 211, a ROM 212, a RAM 213, a bus 214, an input/output interface 215, an imaging unit 216, an input unit 217, an output unit 218, a storage unit 219, a communication unit 220, and a drive 221.

Of these, the components other than the imaging unit 216, the input unit 217, the output unit 218, the communication unit 220, and the drive 221 are configured the same as the corresponding components in FIG. 3. Moreover, the processing device 2 can also include a component similar to the sensor unit 116 of the altitude information obtaining device 1.

The imaging unit 216 includes components such as an optical lens unit, an image sensor, and an image processing circuit (not illustrated in the figure) and generates and supplies captured image data to the CPU 211 and the like as appropriate.

The input unit 217 is constituted by various types of buttons, a touch panel or the like, and various types of information are input via the input unit 217 in accordance with input operations by the measurement subject P (user).

The output unit 218 is constituted by a display, speakers or the like and outputs images or sound.

The communication unit 220 controls communication with other devices (not illustrated in the figure) via a network such as the internet. The communication unit 220 also controls communication with other devices performed using direct wireless communications therebetween. In the present embodiment, the communication unit 220 communicates with the altitude information obtaining device 1 using BLE (registered trademark) or Wi-Fi (registered trademark).

The drive 221 accepts, as appropriate, a removable medium 231 such as a magnetic disk, an optical disc, a magneto-optical disc, or semiconductor memory. Programs read from the removable medium 231 by the drive 221 are installed to the storage unit 219 as necessary. Moreover, similar to the storage unit 219, the removable medium 231 can store various types of data such as the image data stored on the storage unit 219.

<Functional Configuration>

Figure 5:
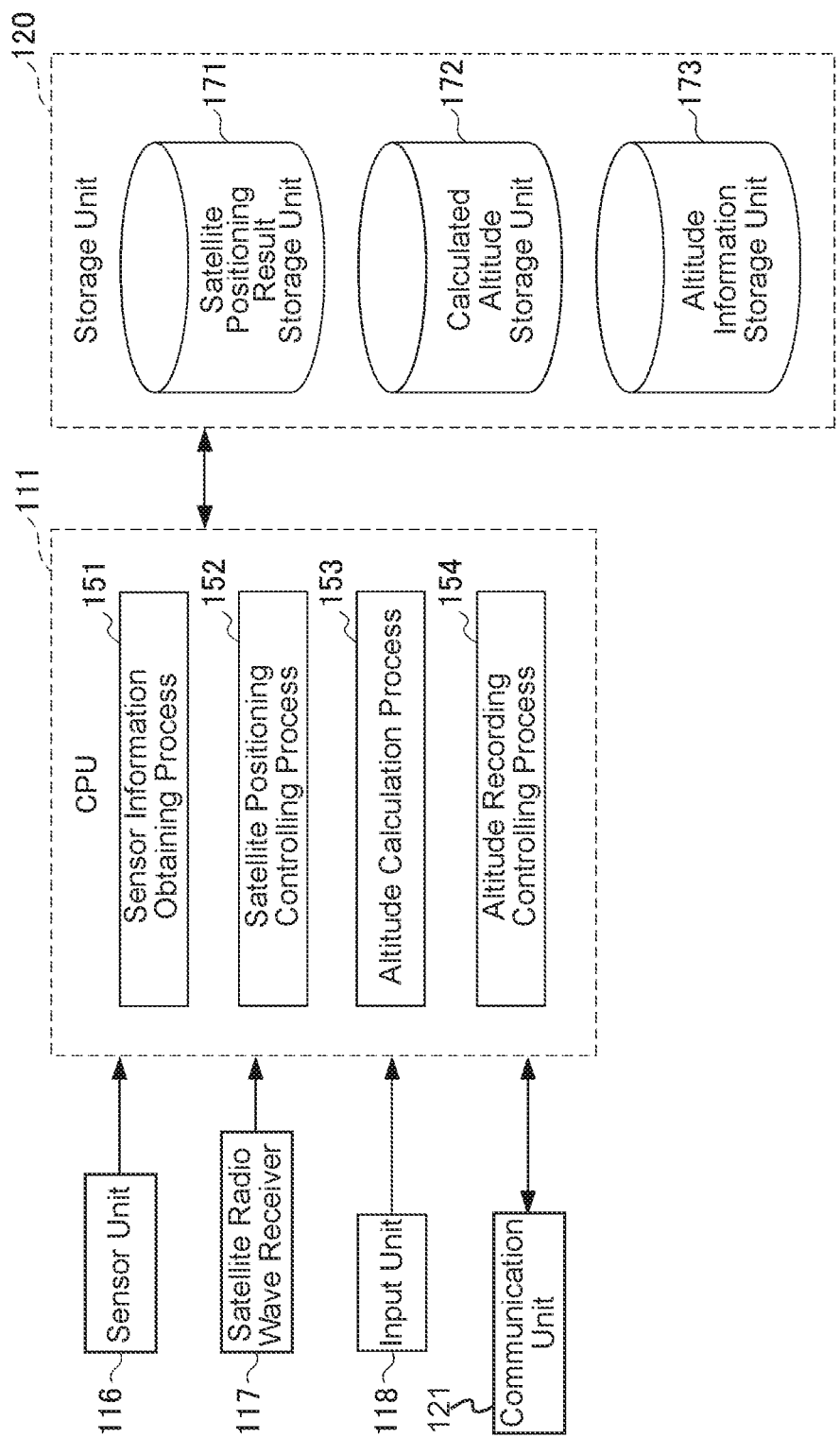
FIG. 5 is a functional block diagram illustrating, among functional configurations of the altitude information obtaining device, a functional configuration for executing a satellite positioning process, an altitude calculation process, and an altitude recording control process.

FIG. 5 is a functional block diagram illustrating, among functional configurations of the altitude information obtaining device 1, a functional configuration for executing the satellite positioning process, the altitude calculation process, and the altitude recording control process.

The satellite positioning process is a sequence of processes for performing positioning on the basis of radio waves received from navigation satellites and then obtaining positional information including altitude.

The altitude calculation process is a sequence of processes for calculating altitude from the atmospheric pressure detected by the atmospheric pressure sensor of the altitude information obtaining device 1.

Furthermore, the altitude recording control process is a sequence of processes for selecting either a positioning-based altitude obtained as a positioning result based on radio waves received from navigation satellites or a calculated altitude obtained as a processing result from the altitude calculation process and then recording the selected altitude as altitude information of the altitude information obtaining device 1.

As illustrated in FIG. 5, when executing the satellite positioning process, the altitude calculation process, and the altitude recording control process, the CPU 111 performs a sensor information obtaining process 151, a satellite positioning controlling process 152, an altitude calculation process 153, and an altitude recording controlling process 154.

Moreover, a satellite positioning result storage unit 171, a calculated altitude storage unit 172, and an altitude information storage unit 173 are configured as regions of the storage unit 120.

The satellite positioning result storage unit 171 stores positioning results (such as latitude, longitude, altitude, and time) from the satellite positioning process in chronological order.

Similarly, the calculated altitude storage unit 172 stores calculated altitudes from the altitude calculation process in chronological order.

Moreover, the altitude information storage unit 173 stores positioning-based altitudes from the satellite positioning process or calculated altitudes from the altitude calculation process (as selected by the altitude recording control process) in chronological order as an altitude information history of the altitude information obtaining device 1.

The sensor information obtaining process 151 obtains sensor information from the various types of sensors of the sensor unit 116.

The satellite positioning controlling process 152 obtains, at a prescribed time interval (such as every one second) and on the basis of radio waves received from navigation satellites, satellite positioning-based positioning results including the position and altitude of the altitude information obtaining device 1. The satellite positioning controlling process 152 also stores the obtained satellite positioning-based positioning results in the satellite positioning result storage unit 171. Furthermore, the satellite positioning controlling process 152 obtains positioning error as estimated from the reception status of the radio waves received from the navigation satellites (in terms of factors such as the arrangement of the navigation satellites, the C/N ratio of the received radio waves, and the number of satellites in view).

The altitude calculation process 153 uses a prescribed conversion formula to, at a prescribed time interval (such as every 1 second), calculate the altitude of the altitude information obtaining device 1 on the basis of the sensor information obtained by the sensor information obtaining process 151 (here, the atmospheric pressure obtained by the atmospheric pressure sensor). The altitude calculation process 153 then stores the calculated altitude in the calculated altitude storage unit 172.

The altitude recording controlling process 154, on the basis of the positioning accuracy of the satellite positioning process, selects and records positioning-based altitudes obtained as positioning results based on radio waves received from navigation satellites or calculated altitudes obtained as processing results from the altitude calculation process. In the present embodiment, when the positioning accuracy of the satellite positioning process is satisfactory (that is, when the positioning error is less than or equal to a prescribed value E1), the altitude recording controlling process 154 selects the positioning-based altitude obtained as a positioning result from the satellite positioning process and records this altitude as the current altitude of the altitude information obtaining device 1. Meanwhile, when the positioning accuracy of the satellite positioning process is not satisfactory (that is, when the positioning error is greater than the prescribed value E1), the altitude recording controlling process 154 selects the calculated altitude obtained as a processing result from the altitude calculation process and records this altitude as the current altitude of the altitude information obtaining device 1. Furthermore, the altitude recording controlling process 154 stores the selected positioning-based altitude or calculated altitude in the altitude information storage unit 173 and also sends this altitude to the processing device 2.

Figure 6:
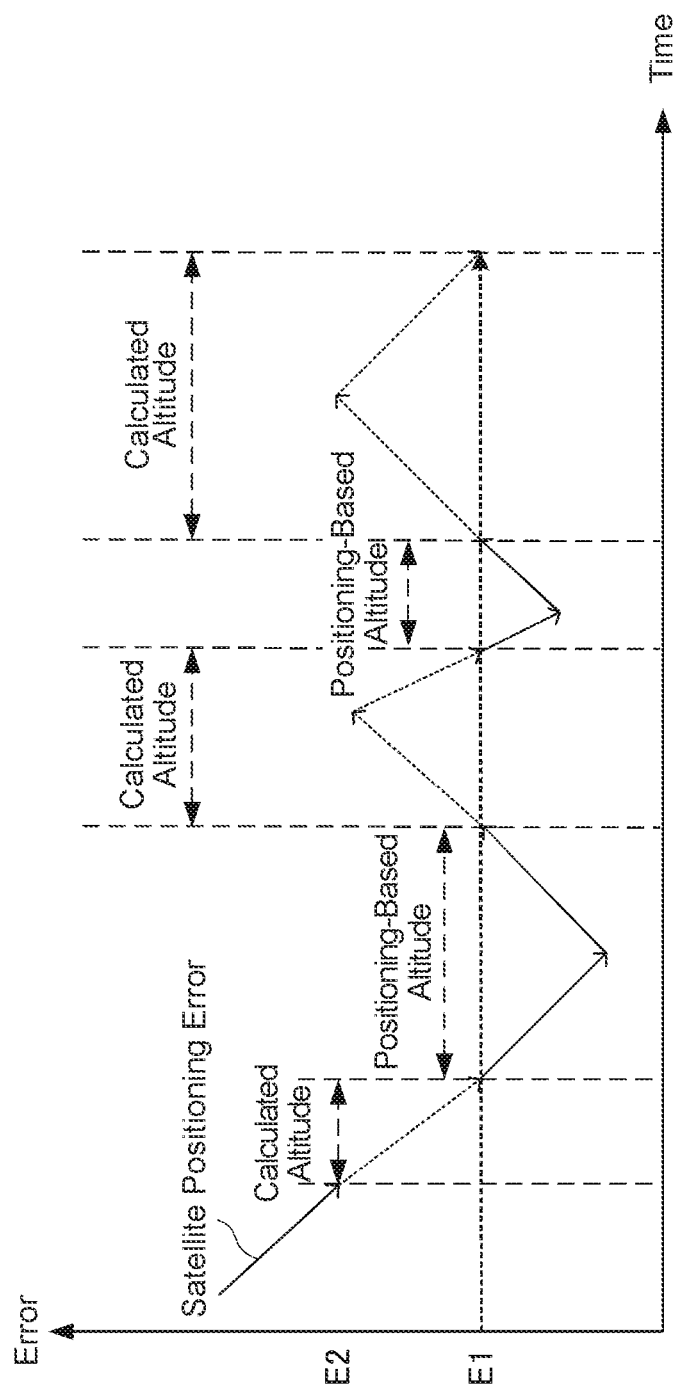
FIG. 6 is a schematic drawing illustrating how altitude information gets selected and recorded in accordance with satellite positioning error.

FIG. 6 is a schematic drawing illustrating how altitude information gets selected and recorded in accordance with the satellite positioning error.

As illustrated in FIG. 6, waiting from immediately after satellite positioning begins (such as during a cold startup) until positioning accuracy becomes satisfactory can take a relatively long time. Therefore, when the positioning accuracy of the satellite positioning process is relatively low (during the 3D fix stage, for example), the positioning-based altitude obtained as a positioning result based on radio waves received from navigation satellites is set as an initial altitude.

In other words, immediately after satellite positioning begins, a value E2 which is greater than the prescribed value E1 is set as a threshold to use satellite positioning, and once the positioning error becomes less than or equal to E2, the positioning-based altitude obtained as a positioning result based on radio waves received from navigation satellites is used and set as the initial altitude.

Then, until the positioning accuracy of satellite positioning becomes satisfactory (that is, until the positioning error becomes less than or equal to the prescribed value E1), the calculated altitude obtained as a processing result from the altitude calculation process is selected. Next, once the positioning accuracy becomes satisfactory (that is, once the positioning error becomes less than or equal to the prescribed value E1), the positioning-based altitude obtained as a positioning result from the satellite positioning process is selected. Meanwhile, if the positioning accuracy of the satellite positioning process becomes unsatisfactory (that is, the positioning error becomes greater than the prescribed value E1), the calculated altitude obtained as a processing result from the altitude calculation process is selected.

As this process is repeated, the satellite positioning-based altitude is selected while the positioning accuracy of the satellite positioning process is satisfactory, and the calculated altitude from the altitude calculation process is selected while the positioning accuracy of the satellite positioning process is not satisfactory. In this way, whichever altitude information is more reliable based on the current situation gets recorded.

Figure 7:
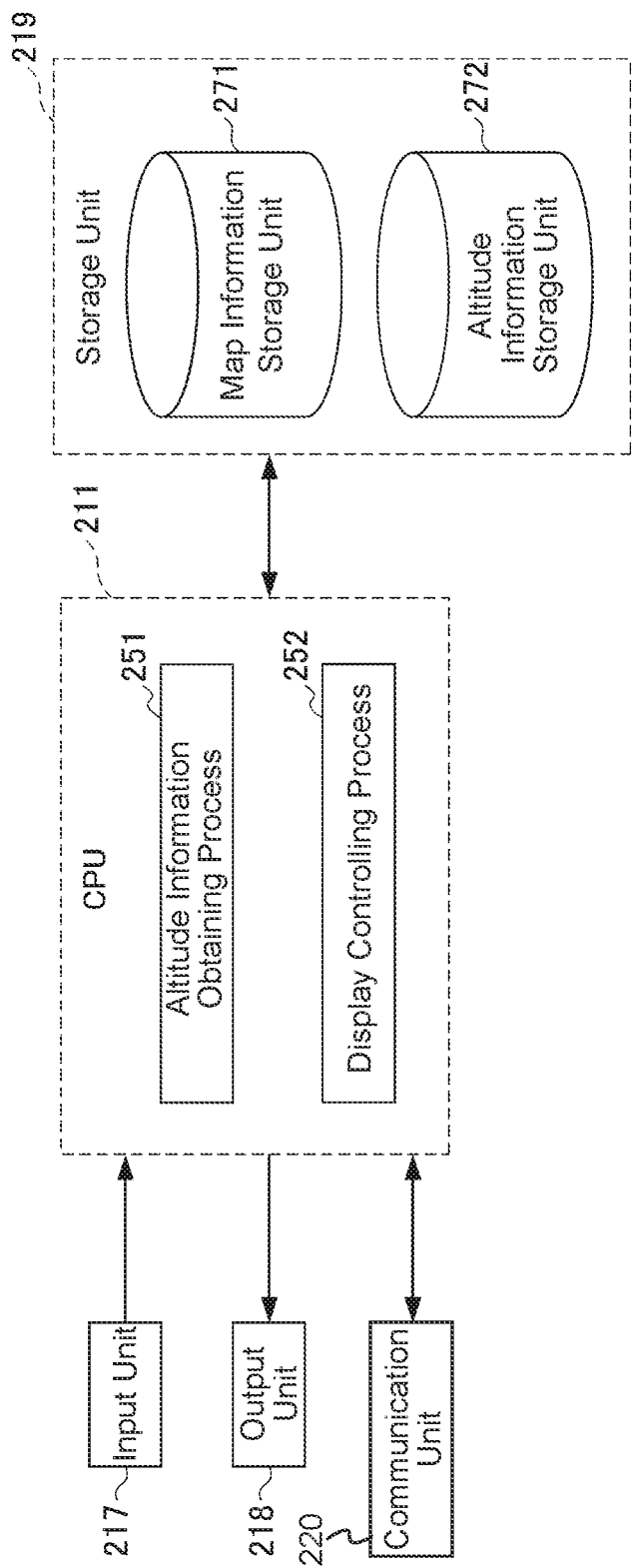
FIG. 7 is a functional block diagram illustrating, among functional configurations of the processing device, a functional configuration for executing an altitude display process.

FIG. 7 is a functional block diagram illustrating, among functional configurations of the processing device 2, a functional configuration for executing an altitude display process.

The altitude display process is a sequence of processes for obtaining the altitude information output from the altitude information obtaining device 1 and then displaying an altitude information history of the altitude information obtaining device 1.

As illustrated in FIG. 7, when executing the altitude display process, the CPU 211 performs an altitude information obtaining process 251 and a display controlling process 252.

Moreover, a map data storage unit 271 and an altitude information storage unit 272 are configured as regions of the storage unit 219.

The map data storage unit 271 stores map data for positions obtained with satellite positioning or dead reckoning to be displayed on in a superimposed manner.

The altitude information storage unit 272 stores positioning-based altitudes or calculated altitudes received from the altitude information obtaining device 1 (that is, from the altitude recording controlling process 154 thereof) in chronological order as an altitude information history of the altitude information obtaining device 1. Moreover, satellite positioning error obtained by the altitude information obtaining process 251 is stored in association with the altitude information history of the altitude information obtaining device 1.

The altitude information obtaining process 251 obtains positioning-based altitudes or calculated altitudes received from the altitude information obtaining device 1 (that is, from the altitude recording controlling process 154 thereof). The altitude information obtaining process 251 also stores the obtained positioning-based altitudes or calculated altitudes in the altitude information storage unit 272. In the present embodiment, when obtaining the positioning-based altitudes or calculated altitudes, the altitude information obtaining process 251 also obtains positioning results and stores a movement history including the position and altitude of the altitude information obtaining device 1 in the altitude information storage unit 272. Moreover, the satellite positioning-based positioning results include positioning error estimated from the reception status of radio waves received from navigation satellites, and the altitude information obtaining process 251 stores the obtained positioning error in the altitude information storage unit 272 in association with the altitude information history.

The display controlling process 252, in accordance with altitude information history display instructions input via the input unit 217, reads the altitude information history to be displayed from the altitude information storage unit 272. Then, the display controlling process 252 displays the altitude information history read from the altitude information storage unit 272 as time series data (such as an altitude graph, for example). Moreover, when displaying the altitude information history to be displayed, the display controlling process 252 may read map data for the surrounding areas from the map data storage unit 271 and then display the altitude information history so as to be superimposed onto the map data read from the map data storage unit 271.

<Operation>

Next, the operation of the altitude information recording system S will be described.

<Satellite Positioning Process>

Figure 8:
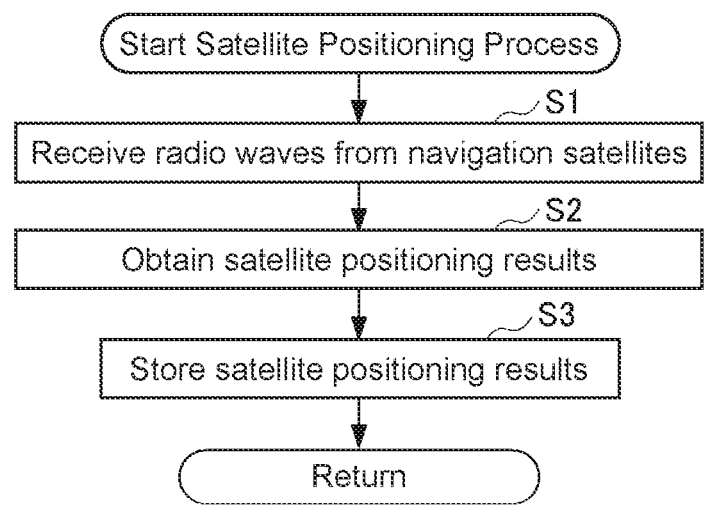
FIG. 8 is a flowchart for explaining the flow of the satellite positioning process executed by the altitude information obtaining device illustrated in FIG. 3 and having the functional configuration illustrated in FIG. 5.

FIG. 8 is a flowchart for explaining the flow of the satellite positioning process executed by the altitude information obtaining device 1 illustrated in FIG. 3 and having the functional configuration illustrated in FIG. 5.

The satellite positioning process begins when a satellite positioning process start instruction is input via the input unit 118.

In step S1, the satellite positioning controlling process 152 receives radio waves from navigation satellites.

In step S2, the satellite positioning controlling process 152 obtains, at a prescribed time interval (such as every one second) and on the basis of the received radio waves from the navigation satellites, satellite positioning results including the position and altitude of the altitude information obtaining device 1.

In step S3, the satellite positioning controlling process 152 stores the obtained satellite positioning-based positioning results in the satellite positioning result storage unit 171.

After step S3, the satellite positioning process is repeated until a satellite positioning process stop instruction is input via the input unit 118.

<Altitude Calculation Process>

Figure 9:
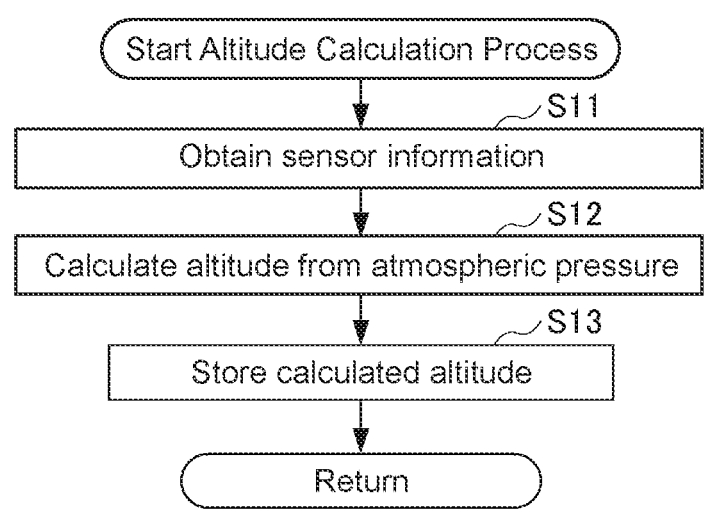
FIG. 9 is a flowchart for explaining the flow of the altitude calculation process executed by the altitude information obtaining device illustrated in FIG. 3 and having the functional configuration illustrated in FIG. 5.

FIG. 9 is a flowchart for explaining the flow of the altitude calculation process executed by the altitude information obtaining device 1 illustrated in FIG. 3 and having the functional configuration illustrated in FIG. 5.

The altitude calculation process begins when an altitude calculation process start instruction is input via the input unit 118.

In step S11, the sensor information obtaining process 151 obtains sensor information including atmospheric pressure from the various types of sensors of the sensor unit 116.

In step S12, the altitude calculation process 153 uses a prescribed conversion formula to calculate the altitude of the altitude information obtaining device 1 on the basis of the sensor information obtained by the sensor information obtaining process 151 (here, the atmospheric pressure obtained by the atmospheric pressure sensor).

In step S13, the altitude calculation process 153 stores the calculated altitude in the calculated altitude storage unit 172.

After step S13, the altitude calculation process is repeated until an altitude calculation process stop instruction is input via the input unit 118.

<Recording Control Process>

Figure 10:
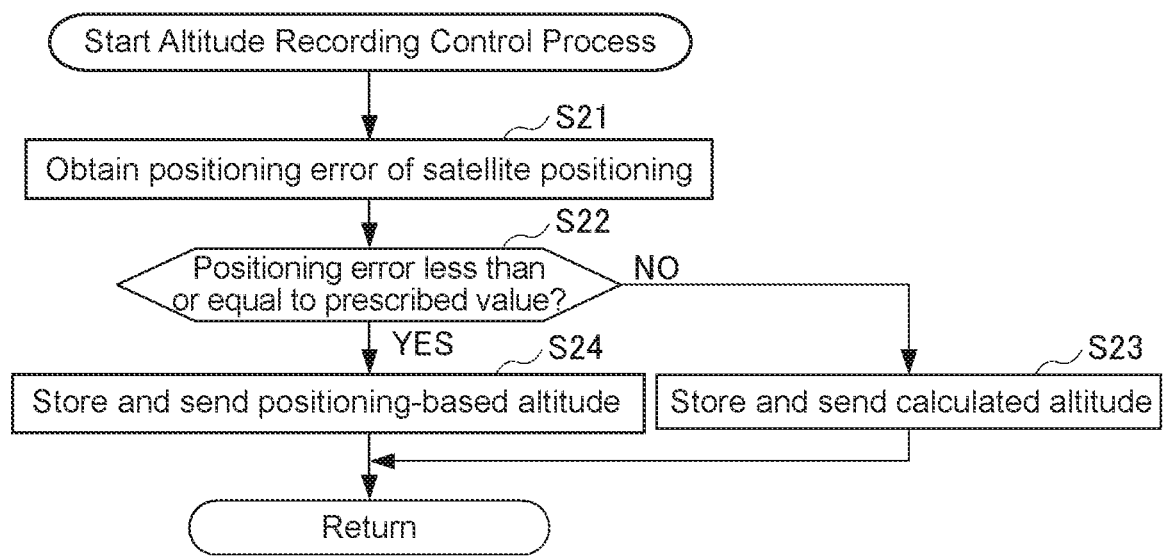
FIG. 10 is a flowchart for explaining the flow of the altitude recording control process executed by the altitude information obtaining device illustrated in FIG. 3 and having the functional configuration illustrated in FIG. 5.

FIG. 10 is a flowchart for explaining the flow of the altitude recording control process executed by the altitude information obtaining device 1 illustrated in FIG. 3 and having the functional configuration illustrated in FIG. 5.

The altitude recording control process begins when an altitude recording control process start instruction is input via the input unit 118.

In step S21, the altitude recording controlling process 154 obtains the positioning error in the satellite positioning obtained by the satellite positioning controlling process 152.

In step S22, the altitude recording controlling process 154 determines whether the positioning error in the satellite positioning is less than or equal to the prescribed value E1.

If the positioning error in the satellite positioning is not less than or equal to the prescribed value E1, the determination in step S22 yields NO, and the process proceeds to step S23.

On the other hand, if the positioning error in the satellite positioning is less than or equal to the prescribed value E1, the determination in step S22 yields YES, and the process proceeds to step S24.

In step S23, the altitude recording controlling process 154 selects the calculated altitude obtained as a processing result from the altitude calculation process, stores this altitude in the altitude information storage unit 173, and sends this altitude to the processing device 2.

In step S24, the altitude recording controlling process 154 selects the positioning-based altitude obtained as a positioning result based on radio waves received from navigation satellites, stores this altitude in the altitude information storage unit 173, and sends this altitude to the processing device 2.

After step S23 and step S24, the altitude recording control process is repeated until an altitude recording control process stop instruction is input via the input unit 118.

<Altitude Display Process>

Figure 11:
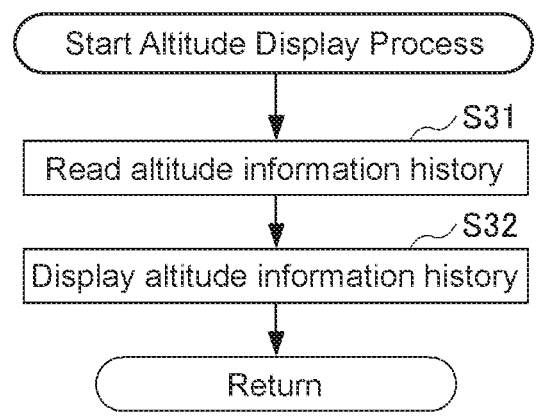
FIG. 11 is a flowchart for explaining the flow of the altitude display process executed by the processing device illustrated in FIG. 4 and having the functional configuration illustrated in FIG. 7.

FIG. 11 is a flowchart for explaining the flow of the altitude display process executed by the processing device 2 illustrated in FIG. 4 and having the functional configuration illustrated in FIG. 7.

The altitude display process begins when an altitude display process start instruction is input via the input unit 217. Note that the altitude display process can be executed either by displaying the altitude information history of the altitude information obtaining device 1 that has been stored in the altitude information storage unit 272 at a later time or by displaying the altitude information history of the altitude information obtaining device 1 in a successively updated manner while the altitude information obtaining device 1 is obtaining the altitude information.

In step S31, the display controlling process 252 reads the altitude information history to be displayed from the altitude information storage unit 272.

In step S32, the display controlling process 252 displays the altitude information history read from the altitude information storage unit 272 as time series data (such as an altitude graph, for example).

After step S32, the altitude display process is repeated until an altitude display process stop instruction is input via the input unit 217.

Due to this process, when the positioning accuracy of the satellite positioning process is satisfactory (that is, when the positioning error is less than or equal to the prescribed value), the positioning-based altitude obtained as a positioning result from the satellite positioning process is selected and recorded as the current altitude of the altitude information obtaining device 1. On the other hand, when the positioning accuracy of the satellite positioning process is not satisfactory (that is, when the positioning error is greater than the prescribed value E1), the calculated altitude obtained as a processing result from the altitude calculation process is selected and recorded as the current altitude of the altitude information obtaining device 1.

Therefore, when the accuracy of the positioning-based altitude obtained as a positioning result from the satellite positioning process can be guaranteed, the satellite positioning-based altitude can be recorded. Moreover, when the accuracy of the positioning-based altitude obtained as a positioning result from the satellite positioning process cannot be guaranteed, the altitude information can be interpolated using the calculated altitudes calculated from the detection results of the atmospheric pressure sensor.

Thus, the altitude information obtaining device 1 makes it possible to improve altitude measurement accuracy.

In the above embodiment, both altitude information by the satellite positioning controlling process 152, i.e., altitude information based on satellite positioning, and altitude information by the altitude calculation process 153, i.e., altitude information based on atmospheric pressure data, were obtained at the location of the device 1, and on the basis of the determined error in the satellite positioning, either of the altitude information by the satellite positioning controlling process 152 or the altitude information by the altitude calculation process 153 was selectively recorded in the altitude information storage unit 173 and sent to the processing device 2. Alternatively, the above embodiment may be modified as follows. First, the error in the satellite positioning is obtained prior to performing either of the satellite positioning controlling process 152 and the altitude calculation process 153. When the obtained error is less than or equal to the prescribed value E1, only the satellite positioning controlling process 152 is performed to obtain altitude information, and the altitude information thus obtained is recorded in the altitude information storage unit 173 and sent to the processing device 2. On the other hand, when the obtained error is greater than a prescribed value E1, only the altitude calculation process 153 is performed to obtain altitude information, and the altitude information thus obtained is recorded in the altitude information storage unit 173 and sent to the processing device 2.

Embodiment 2

Next, Embodiment 2 of the present invention will be described.

In the altitude information recording system S of Embodiment 1, the processing device 2 displays the positioning-based altitudes or calculated altitudes received from the altitude information obtaining device 1 (that is, from the altitude recording controlling process 154 thereof) in chronological order as an altitude information history of the altitude information obtaining device 1.

The present embodiment is different from Embodiment 1 in that the processing device 2 (which is one embodiment of an electronic device according to the present invention) executes a process of referencing the positioning error in satellite positioning and then, on the basis of this positioning error in satellite positioning, correcting the calculated altitude calculated by the altitude calculation process 153 (the altitude information correction process described below).

The following description focuses mainly on the portions of the altitude information recording system S that are different from in Embodiment 1.

<Hardware Configuration>

The hardware configurations of the altitude information obtaining device 1 and the processing device 2 of the present embodiment are the same as the configurations illustrated in FIGS. 3 and 4 for Embodiment 1.

Therefore, for descriptions of the hardware configurations of the altitude information obtaining device 1 and the processing device 2 of the present embodiment, refer to the descriptions of FIGS. 3 and 4 in Embodiment 1.

<Functional Configuration>

In the present embodiment, the main functional configuration of the altitude information obtaining device 1 is the same as the configuration illustrated in FIG. 5 for Embodiment 1 except for the configuration of the altitude recording controlling process 154.

Moreover, in the present embodiment, the time interval (hereinafter, referred to as a "satellite positioning interval" as appropriate) at which the satellite positioning controlling process 152 obtains satellite positioning-based positioning results (positioning-based altitudes) is set to a value longer than in Embodiment 1, such as every 10 minutes. Meanwhile, the time interval at which the altitude calculation process 153 calculates the altitude of the altitude information obtaining device 1 (calculated altitudes) is set to the same value as in Embodiment 1, such as every one second. When it is time to obtain satellite positioning results, the satellite positioning controlling process 152 starts up the satellite radio wave receiver 117 and then, once satellite positioning becomes available, obtains the satellite positioning results. Here, if satellite positioning remains unavailable even after a prescribed timeout time has elapsed since starting up the satellite radio wave receiver 117, the satellite positioning controlling process 152 determines that the current reception environment is inadequate and stops the satellite radio wave receiver 117. Then, once the satellite positioning interval has elapsed, the satellite positioning controlling process 152 starts up the satellite radio wave receiver 117 again. Furthermore, during the periods in which no satellite positioning-based positioning results (positioning-based altitudes) are obtained, the altitude information is interpolated using the altitudes (calculated altitudes) calculated by the altitude calculation process 153.

When the satellite positioning controlling process 152 obtains satellite positioning-based positioning results, the altitude recording controlling process 154 records the obtained positioning results (positioning-based altitudes) in the altitude information storage unit 173. Moreover, when the altitude calculation process 153 calculates the altitude of the altitude information obtaining device 1, the altitude recording controlling process 154 records the altitudes thus calculated (calculated altitudes) in the altitude information storage unit 173. In other words, the altitude recording controlling process 154 records both positioning-based altitudes and calculated altitudes in the altitude information storage unit 173 in chronological order. Furthermore, positioning error estimated from the reception status of the radio waves received from navigation satellites is recorded in association with the positioning-based altitudes. In the present embodiment, each time a satellite positioning-based altitude or a calculated altitude from the altitude calculation process 153 is obtained, the altitude recording controlling process 154 sends the positioning-based altitude (and the associated positioning error) or the calculated altitude to the processing device 2.

Figure 12:
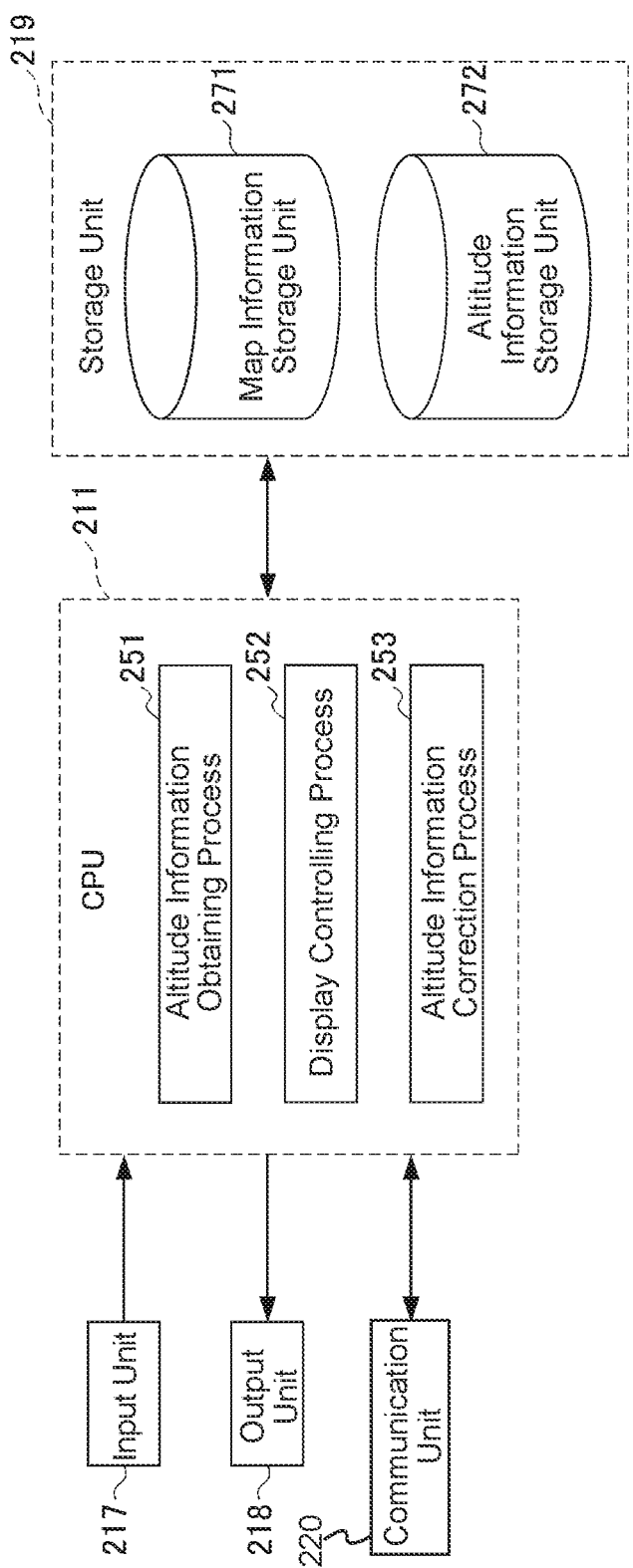
FIG. 12 is a functional block diagram illustrating, among functional configurations of a processing device according to Embodiment 2, a functional configuration for executing an altitude display process and an altitude information correction process.

FIG. 12 is a functional block diagram illustrating, among functional configurations of the processing device 2 according to Embodiment 2, a functional configuration for executing an altitude display process and an altitude information correction process.

Note that in FIG. 12, the functional blocks for executing the altitude display process are the same as in the configuration illustrated in FIG. 7 for Embodiment 1 and therefore will not be described here.

Next, an altitude information correction process 253, which is the functional block for executing the altitude information correction process, will be described.

The altitude information correction process 253 reads the altitude information history of the altitude information obtaining device 1 as well as the satellite positioning error stored in association with that altitude information history from the altitude information storage unit 272. Moreover, the altitude information correction process 253 identifies, in the altitude information history thus read, a location (hereinafter, referred to as "maximum accuracy location" as appropriate) which has the minimum satellite positioning error. Furthermore, the altitude information correction process 253 obtains, for the maximum accuracy location thus identified, the error (hereinafter, referred to as "error offset" as appropriate) between the positioning-based altitude from the satellite positioning process and the calculated altitude from the altitude calculation process. Then, the altitude information correction process 253 removes the obtained error offset from all of the calculated altitudes that are obtained by the altitude calculation process and stored in the altitude information storage unit 272, thereby correcting those calculated altitudes. Note that this process of correcting calculated altitudes by removing the error offset from all of the calculated altitudes that are obtained by the altitude calculation process and stored in the altitude information storage unit 272 will be referred to as "overall offset correction" below. This overall offset correction makes it possible to improve altitude measurement accuracy.

The altitude information correction process 253 also compares the overall offset-corrected calculated altitudes to the satellite positioning-based altitudes. Then, for a satellite positioning-based positioning location adjacent to the maximum accuracy location, the altitude information correction process 253 determines whether the overall offset-corrected calculated altitude is included within a positioning error range for the satellite positioning-based altitude. If the overall offset-corrected calculated altitude is not included within the positioning error range for the satellite positioning-based altitude at the satellite positioning-based positioning location adjacent to the maximum accuracy location, the altitude information correction process 253 corrects the overall offset-corrected calculated altitude to be within the positioning error range for the satellite positioning-based altitude. Note that this process of correcting the overall offset-corrected calculated altitude to be within the positioning error range for the satellite positioning-based altitude will be referred to as "individual error correction" below. In the present embodiment, when applying this individual error correction, the altitude information correction process 253 corrects the overall offset-corrected calculated altitude to a value having the shortest correction distance to the positioning error range for the satellite positioning-based altitude (that is, a value at the outer edge of the positioning error range). At this time, the altitude information correction process 253 applies a correction (such as a first-order transformation, for example) which linearly rotates characteristics (a graph) indicating the calculated altitudes for between the maximum accuracy location and the adjacent satellite positioning-based positioning location about the value corresponding to the maximum accuracy location. In this way, starting from the maximum accuracy location, the altitude information correction process 253 consecutively proceeds to apply the individual error correction between adjacent positioning locations in order. This makes it possible to further improve altitude measurement accuracy.

Figure 13:
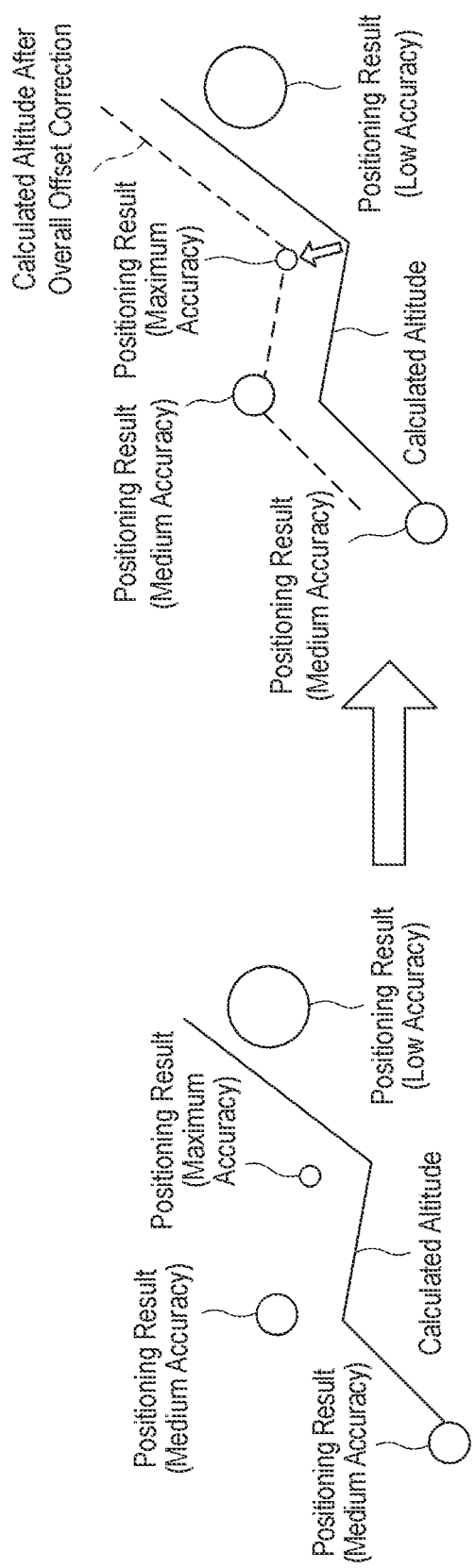
FIG. 13 is a schematic drawing illustrating how an overall offset correction is applied to calculated altitudes.

FIG. 13 is a schematic drawing illustrating how the overall offset correction is applied to the calculated altitudes.

Note that in FIG. 13, the sizes of the circles representing positioning-based altitudes indicate the magnitude of positioning error in those altitudes (that is, the positioning accuracy). This also applies to FIG. 14.

As illustrated in FIG. 13, in the present embodiment, satellite positioning-based altitudes are obtained intermittently, while calculated altitudes from the altitude calculation process are obtained substantially continuously.

Moreover, the maximum accuracy location which has the minimum satellite positioning error is identified among the satellite positioning-based altitudes, and for this identified maximum accuracy location, the error offset between the satellite positioning-based altitude from the satellite positioning process and the calculated altitude from the altitude calculation process is obtained.

Then, the overall offset correction is applied to remove this error offset from all of the calculated altitudes from the altitude calculation process.

As a result, the calculated altitudes from the altitude calculation process, which are indicated by the solid line in FIG. 13, are corrected to the altitudes indicated by the dashed line.

In other words, the calculated altitudes from the altitude calculation process are corrected on the basis of the positioning-based altitude having the minimum satellite positioning error.

This makes it possible to improve altitude measurement accuracy.

Figure 14:
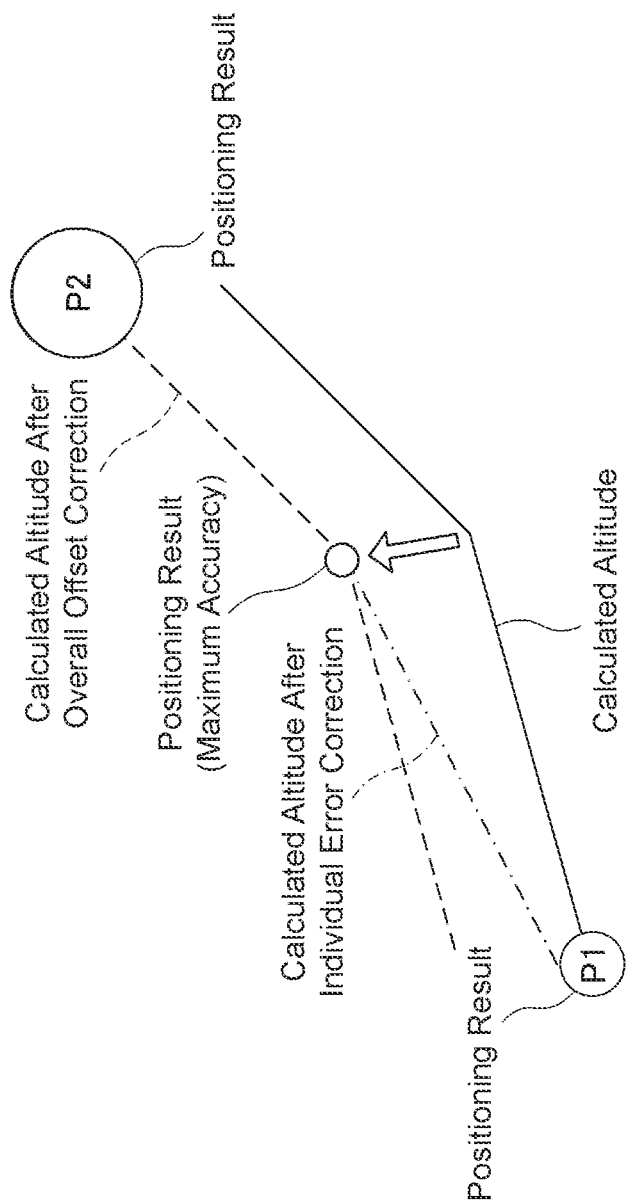
FIG. 14 is a schematic drawing illustrating how an individual error correction is applied to overall offset-corrected calculated altitudes.

FIG. 14 is a schematic drawing illustrating how the individual error correction is applied to the overall offset-corrected calculated altitudes.

As illustrated in FIG. 14, as a result of applying the overall offset correction to remove the error offset and correct the calculated altitudes based on the maximum accuracy location, the overall offset-corrected calculated altitude is included within the satellite positioning error range corresponding to the positioning results for a positioning location P2 that comes after the maximum accuracy location in chronological order. However, the overall offset-corrected calculated altitude is not included within the satellite positioning error range corresponding to the positioning results for a positioning location P1 that comes before the maximum accuracy location in chronological order.

Therefore, for the positioning location P1, the altitude information correction process 253 corrects the overall offset-corrected calculated altitude to a value having the shortest correction distance to the positioning error range for the satellite positioning-based altitude (that is, a value at the outer edge of the positioning error range).

At this time, the altitude information correction process 253 applies a linear rotation (such as a first-order transformation, for example) about the value corresponding to the maximum accuracy location to characteristics (a graph) indicating the calculated altitudes for between the maximum accuracy location and the adjacent satellite positioning-based positioning location, thereby correcting all of the overall offset-corrected calculated altitudes for between the maximum accuracy location and the adjacent positioning location (the dot-dashed line in FIG. 14).

Returning to FIG. 12, the display controlling process 252 of the present embodiment reads the satellite positioning-based positioning results and the calculated altitudes corrected by the altitude information correction process 253 from the altitude information storage unit 272 and then displays this data as a time series (such as an altitude graph, for example) showing the altitude information history.

Note that the altitude information correction process can also be executed by the altitude information obtaining device 1.

In such a case, the satellite positioning-based altitudes and the calculated altitudes corrected by the altitude information correction process can be sent to and displayed by the processing device 2 as the altitude information history of the altitude information obtaining device 1.

<Operation>

Next, the operation of the altitude information recording system S according to Embodiment 2 will be described.

<Altitude Information Correction Process>

Figure 15:
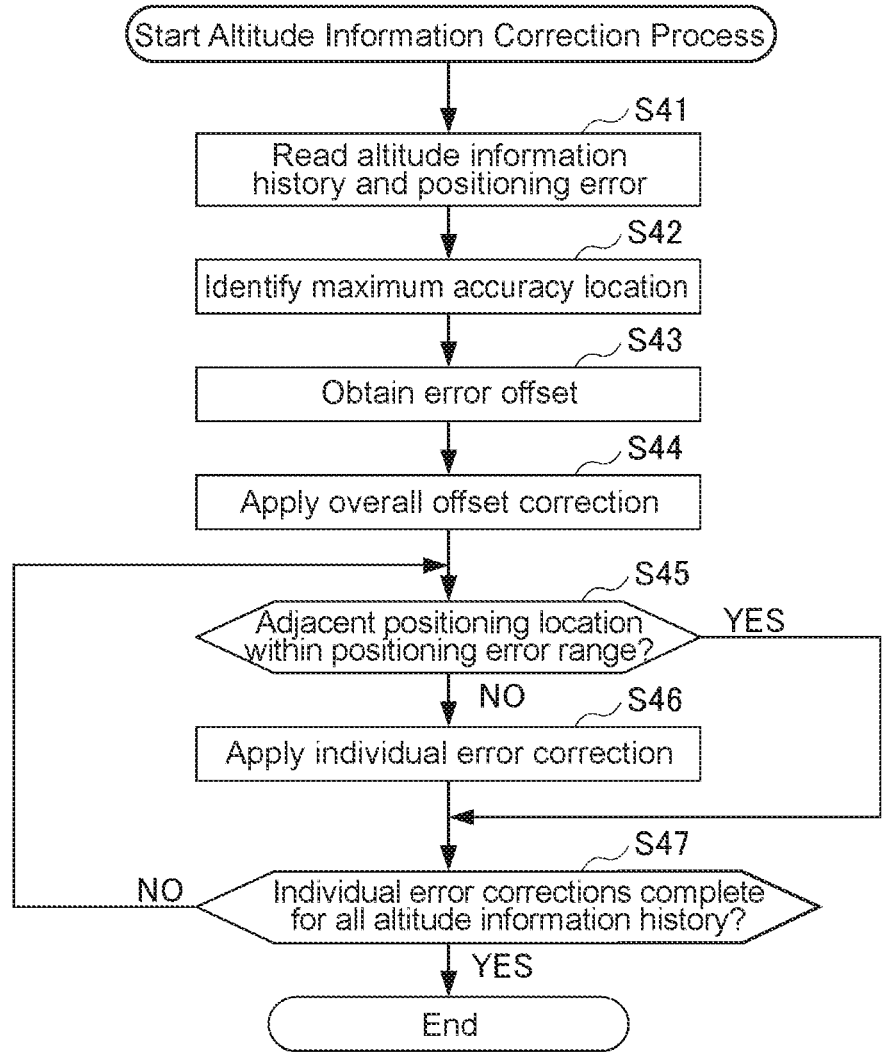
FIG. 15 is a flowchart for explaining the flow of the altitude information correction process executed by the processing device illustrated in FIG. 4 and having the functional configuration illustrated in FIG. 12.

FIG. 15 is a flowchart for explaining the flow of the altitude information correction process executed by the processing device 2 illustrated in FIG. 4 and having the functional configuration illustrated in FIG. 12.

The altitude information correction process begins when an altitude information correction process start instruction is input via the input unit 217. Note that the altitude information correction process can be executed either when displaying the altitude information history of the altitude information obtaining device 1 that has been stored in the altitude information storage unit 272 at a later time or when displaying the altitude information history of the altitude information obtaining device 1 in a successively updated manner while the altitude information obtaining device 1 is obtaining the altitude information.

In step S41, the altitude information correction process 253 reads the altitude information history of the altitude information obtaining device 1 and the satellite positioning error stored in association with that altitude information history from the altitude information storage unit 272.

In step S42, the altitude information correction process 253 identifies, in the altitude information history thus read, the location (maximum accuracy location) which has the minimum satellite positioning error.

In step S43, the altitude information correction process 253 obtains, for the maximum accuracy location thus identified, the error (error offset) between the positioning-based altitude from the satellite positioning process and the calculated altitude from the altitude calculation process.

In step S44, the altitude information correction process 253 applies the overall offset correction to remove the obtained error offset from all of the calculated altitudes that have been obtained by the altitude calculation process and stored in the altitude information storage unit 272.

In step S45, the altitude information correction process 253 determines, for a satellite positioning-based positioning location adjacent to the maximum accuracy location, whether the overall offset-corrected calculated altitude is included within a positioning error range for the satellite positioning-based altitude.

If the overall offset-corrected calculated altitude is not included within the positioning error range for the satellite positioning-based altitude at the satellite positioning-based positioning location adjacent to the maximum accuracy location, the determination in step S45 yields NO, and the process proceeds to step S46.

If the overall offset-corrected calculated altitude is included within the positioning error range for the satellite positioning-based altitude at the satellite positioning-based positioning location adjacent to the maximum accuracy location, the determination in step S45 yields YES, and the process proceeds to step S47.

In step S46, the altitude information correction process 253 applies an individual error correction to bring the overall offset-corrected calculated altitude within the positioning error range for the satellite positioning-based altitude.

In step S47, the altitude information correction process 253 determines whether the individual error corrections have been completed for all of the altitude information history read from the altitude information storage unit 272.

If the individual error corrections have not been completed for all of the altitude information history read from the altitude information storage unit 272, the determination in step S47 yields NO, and the process returns to step S45.

On the other hand, if the individual error corrections have been completed for all of the altitude information history read from the altitude information storage unit 272, the determination in step S47 yields YES, and the altitude information correction process ends.

Due to this process, the overall offset correction can be applied to the calculated altitudes obtained from the altitude calculation process on the basis of the positioning results for the maximum accuracy location which has the minimum satellite positioning error, thereby making it possible to improve altitude measurement accuracy. Moreover, the overall offset-corrected calculated altitudes can be individually error-corrected on the basis of the satellite positioning error for each positioning location, thereby making it possible to further improve altitude measurement accuracy.

Modification Example 1

In Embodiment 1, the altitude recording controlling process 154 selects a positioning-based altitude obtained as a positioning result from the satellite positioning process when the positioning accuracy of the satellite positioning process is satisfactory (that is, when the positioning error is less than or equal to the prescribed value E1) or selects a calculated altitude obtained as a processing result from the altitude calculation process when the positioning accuracy of the satellite positioning process is not satisfactory (that is, when the positioning error is greater than the prescribed value E1), and then records the selected altitude as the current altitude of the altitude information obtaining device 1.

In regards to this control condition, the altitude recording controlling process 154 may measure the time or distance for which the calculated altitudes obtained as processing results from the altitude calculation process have been selected and may then, if the time or distance for which the calculated altitudes obtained as processing results from the altitude calculation process have been selected exceeds a prescribed time or distance (a constant or variable threshold value), modify the selection condition so as to make the positioning-based altitudes obtained as positioning results from the satellite positioning process more likely to be selected.

In other words, the prescribed value E1 for evaluating the positioning error in satellite positioning can be increased so that even when the positioning error is relatively large, the positioning accuracy of the satellite positioning process is still determined to be satisfactory, thereby making the positioning-based altitudes obtained as positioning results from the satellite positioning process more likely to be selected.

This makes it possible to inhibit reductions in positioning accuracy caused by excessive accumulation of error in the altitude calculation process.

Modification Example 2

In the embodiments described above, the altitude recording controlling process 154 may evaluate the reliability of the calculated altitudes obtained as processing results from the altitude calculation process and, when the reliability of the calculated altitudes obtained as processing results from the altitude calculation process is low (that is, when some prescribed condition is not satisfied), may either select the positioning-based altitudes obtained as positioning results based on radio waves received from navigation satellites or select both the positioning-based altitudes obtained as positioning results based on radio waves received from navigation satellites and the calculated altitudes obtained as processing results from the altitude calculation process. For example, when the fluctuations in the altitudes calculated from the atmospheric pressure obtained by the atmospheric pressure sensor exceed some prescribed level due to a rapid weather change or the like, the altitude recording controlling process 154 can determine that the reliability of the calculated altitudes obtained as processing results from the altitude calculation process is low.

This makes it possible to inhibit reductions in the reliability of the recorded altitude information.

The altitude information obtaining device 1 configured as described above includes the satellite positioning controlling process 152, the altitude calculation process 153, and the altitude recording controlling process 154.

The satellite positioning controlling process 152 obtains altitude information for a location using radio waves from navigation satellites.

The altitude calculation process 153 obtains altitude information for the location on the basis of atmospheric pressure data.

The satellite positioning controlling process 152 obtains error in the obtained altitude information.

The altitude recording controlling process 154 outputs the altitude information obtained by the satellite positioning controlling process 152 and the altitude information obtained by the altitude calculation process 153.

The altitude recording controlling process 154, on the basis of the error obtained by the satellite positioning controlling process 152, controls the altitude information obtained by the satellite positioning controlling process 152 and the altitude information obtained by the altitude calculation process 153 to be selectively output (that is, selects which altitude information to output).

This makes it possible to output either of the altitude information obtained by the satellite positioning controlling process 152 or the altitude information obtained by the altitude calculation process 153.

This in turn makes it possible to improve altitude measurement accuracy.

The altitude recording controlling process 154 controls the altitude information obtained by the satellite positioning controlling process 152 to be output when the error obtained by the satellite positioning controlling process 152 is less than or equal to a prescribed value and controls the altitude information obtained by the altitude calculation process 153 to be output when the error obtained by the satellite positioning controlling process 152 is greater than the prescribed value.

This makes it possible to output altitude information obtained using satellite positioning for positioning locations which yield high satellite positioning accuracy and to output the altitude information obtained by the altitude calculation process 153 for other positioning locations.

The altitude recording controlling process 154 controls the altitude information obtained by the satellite positioning controlling process 152 to be output when the error obtained by the satellite positioning controlling process 152 is less than or equal to a prescribed value and then controls the altitude information obtained by the altitude calculation process 153 to be output for a prescribed period of time.

This makes it possible to perform satellite positioning intermittently and then use the altitude information obtained by the altitude calculation process 153 to interpolate between the satellite positioning intervals.

The altitude recording controlling process 154 changes the prescribed value to be greater when a time or distance for which the altitude information obtained by the altitude calculation process 153 has been controlled to be output exceeds a prescribed time or a prescribed distance.

This makes it possible to inhibit reductions in positioning accuracy caused by excessive accumulation of error in the altitude information obtained by the altitude calculation process 153.

The altitude information obtaining device 1 further includes the altitude information storage unit 173.

The altitude information storage unit 173 stores either of the altitude information obtained by the satellite positioning controlling process 152 or the altitude information obtained by the altitude calculation process 153.

The altitude recording controlling process 154 outputs either of the altitude information obtained by the satellite positioning controlling process 152 or the altitude information obtained by the altitude calculation process 153 to the altitude information storage unit 173.

The altitude information obtaining device 1 further includes the communication unit 121.

The communication unit 121 sends either of the altitude information obtained by the satellite positioning controlling process 152 or the altitude information obtained by the altitude calculation process 153 to an external device.

The altitude recording controlling process 154 outputs either of the altitude information obtained by the satellite positioning controlling process 152 or the altitude information obtained by the altitude calculation process 153 to the communication unit 121.

This makes it possible to send the altitude information of the altitude information obtaining device 1 from the altitude information obtaining device 1 to an external device (such as the processing device 2).

The altitude recording controlling process 154 evaluates the reliability of the altitude information obtained by the altitude calculation process 153 and, when the reliability of the altitude information obtained by the altitude calculation process 153 does not satisfy a prescribed condition, controls the altitude information obtained by the satellite positioning controlling process 152 or both the altitude information obtained by the satellite positioning controlling process 152 and the altitude information obtained by the altitude calculation process 153 to be output.

This makes it possible to inhibit reductions in the reliability of the recorded altitude information.

Furthermore, the processing device 2 includes the altitude information correction process 253.

The altitude information correction process 253 references altitude information obtained for a location using radio waves from navigation satellites, altitude information obtained for the location using atmospheric pressure data, and error in the altitude information obtained for the location using radio waves from navigation satellites, and then, on the basis of altitude information obtained for the location using radio waves from navigation satellites for which the error is less than or equal to a prescribed value, corrects the altitude information obtained for the location using the atmospheric pressure data.

This makes it possible to inhibit reductions in the reliability of the recorded altitude information.

The present invention is not limited to the embodiments described above, and various modifications, improvements, or the like within the scope of making it possible to achieve the objectives of the present invention are included in the present invention.

Although in the embodiment described above the altitude information recording system S is constituted by the altitude information obtaining device 1 and the processing device 2 (that is, two devices), the present invention is not limited to this configuration. For example, the altitude information recording system S may be constituted by a single device in which the altitude information obtaining device 1 and the processing device 2 are integrated together, such as by a smartphone having the features of both the altitude information obtaining device 1 and the processing device 2.

In addition, although in the embodiment above the altitude information obtaining device 1 to which the present invention is applied was described as being a sensor device as an example, the present invention is not particularly limited to this configuration.

For example, the present invention can be applied to general electronic devices having positioning process features. More specifically, the present invention can be applied to notebook personal computers, printers, television sets, video cameras, digital cameras, portable navigation devices, mobile phones, smartphones, portable game systems, and the like, for example.

The sequences of processes described above can be implemented with hardware or can be implemented with software.

In other words, the functional configurations illustrated in FIGS. 5, 7 and 12 are only examples and are not particularly limited. The altitude information obtaining device 1 can have any features as long as those features make it possible to perform the sequences of processes described above as a whole, and the types of functional blocks used to implement these features are not particularly limited to the examples illustrated in FIGS. 5, 7 and 12.

Moreover, each functional block may be configured using hardware alone, may be configured using software alone, or may be configured using a combination of both.

The functional configuration of the present embodiment is implemented with a processor that executes processes. Examples of processors that can be used in the present embodiment include processors configured using various types of processing devices such as single processors, multiprocessors, and multi-core processors, as well as configurations in which these various types of processing devices are integrated together with processing circuits such as application-specific integrated circuits (ASICs) or field-programmable gate arrays (FPGAs).

When the sequences of processes are implemented using software, the programs constituting that software are installed on a computer or the like from a network or storage media.

The computer may be a computer embedded in dedicated hardware. Moreover, the computer may be a computer that can perform various types of processes by installing various types of programs, such as a general-purpose personal computer.

The storage media storing these programs includes not only removable media distributed separately from the main device to provide the programs to users but also storage media provided to users already embedded in the main device in advance, or the like. The removable media is a magnetic disk (including a floppy disk), an optical disc, or a magneto-optical disc, for example. The optical disc is a Compact Disc Read-Only Memory (CD-ROM), a Digital Versatile Disc (DVD), a Blu-ray Disc (registered trademark), or the like. The magneto-optical disc is a MiniDisc (MD) or the like. Moreover, the storage media that is provided to users already embedded in the main device in advance includes the ROM 112 illustrated in FIG. 3 that stores programs, the semiconductor memory included in the storage unit 120 illustrated in FIG. 3, or the like, for example.

Furthermore, in the present specification, steps coded in the programs stored on the storage media include not only processes performed in chronological order in accordance with the order of those steps, but also processes that may not necessarily be performed in chronological order but are performed separately or in parallel.

In addition, in the present specification, the term "system" means an overall device constituted by a plurality of devices or a plurality of units or the like.

Although several embodiments of the present invention were described above, these embodiments are only examples and do not limit the technical scope of the present invention. The present invention can take the form of various other embodiments, and various modifications such as removal or replacement of components can be made without departing from the spirit of the present invention. In particular, it is explicitly contemplated that any part or whole of any two or more of the embodiments and their modifications described above can be combined and regarded within the scope of the present invention. These embodiments and modifications thereof are included within the scope and spirit of the invention as described in the present specification and the like and are also included within the scope of the invention as defined in the claims, their equivalents, and the like.

What is claimed is:

1. An electronic device, comprising:
a processor; and
a first storage unit storing programs to be executed by the processor,
wherein the processor reads out the programs stored on the first storage unit to execute:
an error obtaining process of obtaining error in satellite positioning when satellite positioning is to be performed; and
a control process of, on the basis of the error obtained by the error obtaining process, performing either one of or both of a satellite-based altitude information obtaining process and a sensor-based altitude information obtaining process, and causing altitude information obtained by the satellite-based altitude information obtaining process and altitude information obtained by the sensor-based altitude information obtaining process to be selectively output to a user or a component of the electronic device, wherein the satellite-based altitude information obtaining process obtains the altitude information at a location of the electronic device by satellite positioning, and the sensor-based altitude information obtaining process obtains the altitude information at a location of the electronic device on the basis of atmospheric pressure data detected at the location,
wherein in the control process, the altitude information obtained by the satellite-based altitude information obtaining process is caused to be output when the error obtained by the error obtaining process is less than or equal to a prescribed threshold value, and
wherein, once the altitude information obtained by the satellite-based altitude information obtaining process is caused to be output, then the processor thereafter executes the sensor-based altitude information obtaining process only without performing the satellite-based altitude information obtaining process for a prescribed duration of time and causes the altitude information obtained by the sensor-based altitude information obtaining process to be output for said prescribed duration of time.

2. An electronic device, comprising:
a processor; and
a first storage unit storing programs to be executed by the processor,
wherein the processor reads out the programs stored on the first storage unit to execute:
an error obtaining process of obtaining error in satellite positioning when satellite positioning is to be performed; and
a control process of, on the basis of the error obtained by the error obtaining process, performing either one of or both of a satellite-based altitude information obtaining process and a sensor-based altitude information obtaining process, and causing altitude information obtained by the satellite-based altitude information obtaining process and altitude information obtained by the sensor-based altitude information obtaining process to be selectively output to a user or a component of the electronic device, wherein the satellite-based altitude information obtaining process obtains the altitude information at a location of the electronic device by satellite positioning, and the sensor-based altitude information obtaining process obtains the altitude information at a location of the electronic device on the basis of atmospheric pressure data detected at the location,
wherein in the control process, the altitude information obtained by the satellite-based altitude information obtaining process is caused to be output when the error obtained by the error obtaining process is less than or equal to a prescribed threshold value, and the altitude information obtained by the sensor-based altitude information obtaining process is caused to be output when the error obtained by the error obtaining process is greater than the prescribed threshold value, and
wherein the processor further executes a changing process of increasing the prescribed threshold value to a greater threshold value when the error obtained by the error obtaining process is greater than the prescribed threshold value and consequently the altitude information obtained by the sensor-based altitude information obtaining process is caused to be output continuously for more than a prescribed time or a prescribed distance.

3. The electronic device according to claim 1, further comprising:
a second storage unit that is separate from the first storage unit or a portion of the first storage unit,
wherein in the control process, either one of the altitude information obtained by the satellite-based altitude information obtaining process or the altitude information obtained by the sensor-based altitude information obtaining process is caused to be selectively output to the second storage unit.

4. The electronic device according to claim 1, further comprising:
a transmitter unit,
wherein in the control process, either one of the altitude information obtained by the satellite-based altitude information obtaining process or the altitude information obtained by the sensor-based altitude information obtaining process is caused to be selectively output to the transmitter unit for transmitting externally.

5. The electronic device according to claim 1,
wherein the control process further includes:
evaluating reliability of the altitude information obtained by the sensor-based altitude information obtaining process; and
when the reliability of the altitude information obtained by the sensor-based altitude information obtaining process does not satisfy a prescribed condition, causing the altitude information obtained by the satellite-based altitude information obtaining process or both the altitude information obtained by the satellite-based altitude information obtaining process and the altitude information obtained by the sensor-based altitude information obtaining process to be output.

6. An electronic device, comprising:
a processor; and
a storage unit storing a program to be executed by the processor,
wherein the processor reads out the program stored on the storage unit to execute the following:
identifying a location of the electronic device at which satellite-based altitude information that is obtained by satellite positioning has an error that is less than or equal to a prescribed threshold accuracy value; and
performing an altitude correction process of correcting sensor-based altitude information that is obtained using atmospheric pressure data detected at said location, on the basis of said satellite-based altitude information that has the error of less than or equal to the prescribed threshold accuracy value, wherein in performing the altitude correction process, the processor performs the following:

determining an offset to correct the sensor-based altitude information at said identified location;

applying the offset to sensor-based altitude information obtained at each of a plurality of locations that include said identified location so as to create overall offset-corrected sensor-based information for each of the plurality of locations; and if at a location of the plurality of locations that is other than said identified location, said overall offset-corrected sensor-based information is outside of an error range of the satellite-based altitude information at that location, performing an individual error correction process for that location so as to individually correct said overall offset-corrected sensor-based information to be within or at a boundary of said error range.

7. A method of measuring altitude to be performed by a processor in an electronic device, the method comprising:

an error obtaining process of obtaining error in satellite positioning when satellite positioning is to be performed; and a control process of, on the basis of the error obtained by the error obtaining process, performing either one of or both of a satellite-based altitude information obtaining process and a sensor-based altitude information obtaining process, and causing altitude information obtained by the satellite-based altitude information obtaining process and altitude information obtained by the sensor-based altitude information obtaining process to be selectively output to a user or a component of the electronic device, wherein the satellite-based altitude information obtaining process obtains the altitude information at a location of the electronic device by satellite positioning, and the sensor-based altitude information obtaining process obtains the altitude information at a location of the electronic device on the basis of atmospheric pressure data detected at the location, wherein in the control process, the altitude information obtained by the satellite-based altitude information obtaining process is caused to be output when the error obtained by the error obtaining process is less than or equal to a prescribed threshold value, and wherein, once the altitude information obtained by the satellite-based altitude information obtaining process is caused to be output, then only the sensor-based altitude information obtaining process is performed without performing the satellite-based altitude information obtaining process for a prescribed duration of time thereafter and the altitude information obtained by the sensor-based altitude information obtaining process is caused to be output for said prescribed duration of time.

8. A method of measuring altitude to be performed by a processor in an electronic device, the method comprising:

an error obtaining process of obtaining error in satellite positioning when satellite positioning is to be performed; and a control process of, on the basis of the error obtained by the error obtaining process, performing either one of or both of a satellite-based altitude information obtaining process and a sensor-based altitude information obtaining process, and causing altitude information obtained by the satellite-based altitude information obtaining process and altitude information obtained by the sensor-based altitude information obtaining process to be selectively output to a user or a component of the electronic device, wherein the satellite-based altitude information obtaining process obtains the altitude information at a location of the electronic device by satellite positioning, and the sensor-based altitude information obtaining process obtains the altitude information at a location of the electronic device on the basis of atmospheric pressure data detected at the location, wherein in the control process, the altitude information obtained by the satellite-based altitude information obtaining process is caused to be output when the error obtained by the error obtaining process is less than or equal to a prescribed threshold value, and the altitude information obtained by the sensor-based altitude information obtaining process is caused to be output when the error obtained by the error obtaining process is greater than the prescribed threshold value, and wherein the method further comprises: a changing process of increasing the prescribed threshold value to a greater threshold value when the error obtained by the error obtaining process is greater than the prescribed threshold value and consequently the altitude information obtained by the sensor-based altitude information obtaining process is caused to be output continuously for more than a prescribed time or a prescribed distance.

9. The method of measuring altitude according to claim 7, wherein the electronic device further includes a storage unit, and wherein in the control process, either one of the altitude information obtained by the satellite-based altitude information obtaining process or the altitude information obtained by the sensor-based altitude information obtaining process is caused to be selectively output to the storage unit.

10. The method of measuring altitude according to claim 7, wherein the electronic device further includes a transmitter unit, and wherein in the control process, either one of the altitude information obtained by the satellite-based altitude information obtaining process or the altitude information obtained by the sensor-based altitude information obtaining process is caused to be selectively output to the transmitter unit for transmitting externally.

11. The method of measuring altitude according to claim 7, wherein the control process includes:

evaluating reliability of the altitude information obtained by the sensor-based altitude information obtaining process; and when the reliability of the altitude information obtained by the sensor-based altitude information obtaining process does not satisfy a prescribed condition, causing the altitude information obtained by the satellite-based altitude information obtaining process or both the altitude information obtained by the satellite-based altitude information obtaining process and the altitude information obtained by the sensor-based altitude information obtaining process to be output.

12. A method of measuring altitude to be performed by a processor in an electronic device, comprising:

identifying a location of the electronic device at which satellite-based altitude information that is obtained by satellite positioning has an error that is less than or equal to a prescribed threshold accuracy value; and performing an altitude correction process of correcting sensor-based altitude information that is obtained using atmospheric pressure data detected at said location, on the basis of said satellite-based altitude information that has the error of less than or equal to the prescribed threshold accuracy value, wherein the performing of the altitude correction process includes:
- determining an offset to correct the sensor-based altitude information at said identified location;
- applying the offset to sensor-based altitude information obtained at each of a plurality of locations that include said identified location so as to create overall offset-corrected sensor-based information for each of the plurality of locations; and
- if at a location of the plurality of locations that is other than said identified location, said overall offset-corrected sensor-based information is outside of an error range of the satellite-based altitude information at that location, performing an individual error correction process for that location so as to individually correct said overall offset-corrected sensor-based information to be within or at a boundary of said error range at that location.

13. A computer-readable non-transitory storage medium having stored thereon a program to be executed by a processor in an electronic device, the program causing the processor to perform the following:
- an error obtaining process of obtaining error in satellite positioning when satellite positioning is to be performed; and
- a control process of, on the basis of the error obtained by the error obtaining process, performing either one of or both of a satellite-based altitude information obtaining process and a sensor-based altitude information obtaining process, and causing altitude information obtained by the satellite-based altitude information obtaining process and altitude information obtained by the sensor-based altitude information obtaining process to be selectively output to a user or a component of the electronic device, wherein the satellite-based altitude information obtaining process obtains the altitude information at a location of the electronic device by satellite positioning, and the sensor-based altitude information obtaining process obtains the altitude information at a location of the electronic device on the basis of atmospheric pressure data detected at the location, wherein in the control process, the altitude information obtained by the satellite-based altitude information obtaining process is caused to be output when the error obtained by the error obtaining process is less than or equal to a prescribed threshold value, and wherein, once the altitude information obtained by the satellite-based altitude information obtaining process is caused to be output, then the processor thereafter executes the sensor-based altitude information obtaining process only without performing the satellite-based altitude information obtaining process for a prescribed duration of time and causes the altitude information obtained by the sensor-based altitude information obtaining process to be output for said prescribed duration of time.

14. A computer-readable non-transitory storage medium having stored thereon a program to be executed by a processor in an electronic device, the program causing the processor to perform the following:
- identifying a location of the electronic device at which satellite-based altitude information that is obtained by satellite positioning has an error that is less than or equal to a prescribed threshold accuracy value; and
- performing an altitude correction process of correcting sensor-based altitude information that is obtained using atmospheric pressure data detected at said location, on the basis of said satellite-based altitude information that has the error of less than or equal to the prescribed threshold accuracy value, wherein in performing the altitude correction process, the processor performs the following:
- determining an offset to correct the sensor-based altitude information at said identified location;
- applying the offset to sensor-based altitude information obtained at each of a plurality of locations that include said identified location so as to create overall offset-corrected sensor-based information for each of the plurality of locations; and
- if at a location of the plurality of locations that is other than said identified location, said overall offset-corrected sensor-based information is outside of an error range of the satellite-based altitude information at that location, performing an individual error correction process for that location so as to individually correct said overall offset-corrected sensor-based information to be within or at a boundary of said error range.

* * * * *